F. M. & H. S. BENNETT.
FASTENER FOR AUTOMOBILE CHAINS.
APPLICATION FILED JULY 6, 1918.
1,297,063.
Patented Mar. 11, 1919.
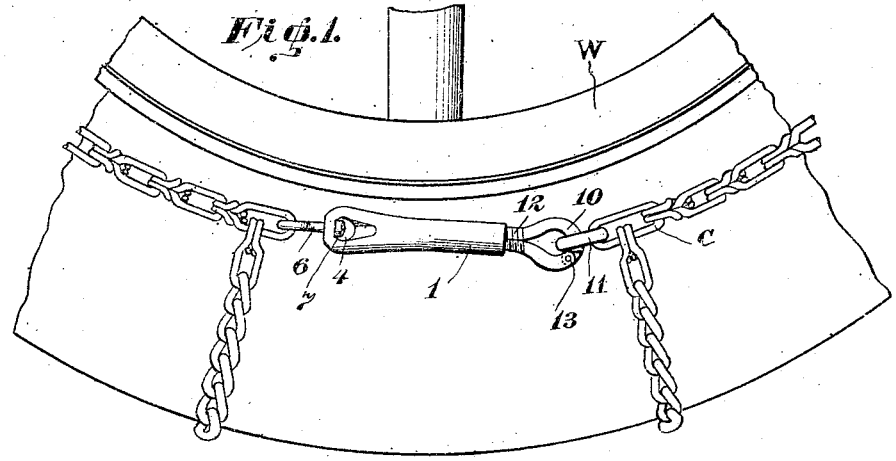
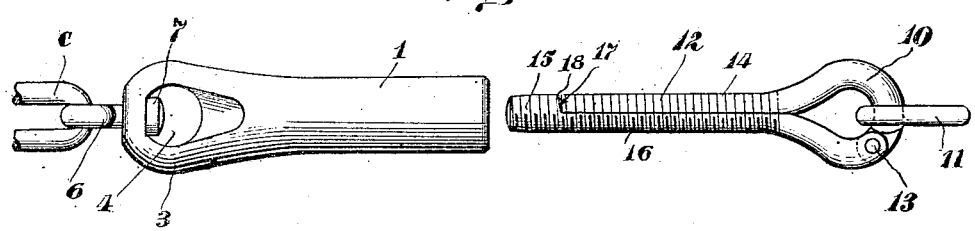
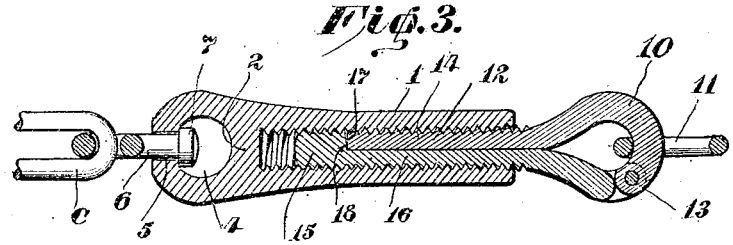
WITNESSES
Thos. F. Knox
N. Collamer
H. S. Bennett
F. M. Bennett
INVENTORS
BY Victor J. Evans
ATTORNEY

UNITED STATES PATENT OFFICE.

FURLONG M. BENNETT, OF BLUEFIELD, WEST VIRGINIA, AND HARLAN S. BENNETT, OF BLAIRSVILLE, PENNSYLVANIA.

FASTENER FOR AUTOMOBILE-CHAINS.

1,297,063.               Specification of Letters Patent.          Patented Mar. 11, 1919.

Application filed July 6, 1918. Serial No. 243,611.

*To all whom it may concern:*

Be it known that we, FURLONG M. BENNETT and HARLAN S. BENNETT, citizens of the United States, residing at Bluefield and Blairsville, in the counties of Mercer and Indiana and States of West Virginia and Pennsylvania, have invented new and useful Improvements in Fasteners for Automobile-Chains, of which the following is a specification.

This invention relates to separable fasteners, and more especially to hooks having locking devices; and the object of the same is to produce a fastener for securing anti-skid chains upon the wheels of automobiles. It is well known to those who have used these chains that they can not be locked on the wheels by the ordinary snap hooks with such degree of security that they do not frequently become unfastened under the rough usage to which they are put, especially when the machine is driven through snow and ice. Our purpose is to devise a fastener which may be useful in many places but has especial utility in this connection, and wherein the parts can not become separated so long as they do not rotate with respect to each other. Details of this improved fastener are set forth in the following specification, reference being had to the accompanying drawings wherein:—

Figure 1 is a side elevation of a portion of an automobile wheel having anti-skid chains thereon, the chains being fastened in place by our improved devices.

Fig. 2 is an enlarged side elevation of one of these fasteners with the parts slightly separated, and Fig. 3 is a longitudinal section with the parts connected.

In Fig. 1 of the drawings, the letter W designates an automobile wheel, and C the chains such as are commonly passed around the tire and rim and fastened thereon in wet or slippery weather to prevent skidding and slipping. Hitherto these chains have been fastened by snap hooks of various types, but we propose to use an improved form of fastening device which is the subject matter of the present invention. We do not wish to be limited, however, to the specific use of our invention, as it is quite obvious that it may be used elsewhere with advantage.

Referring now to the other views of the drawings, the numeral 1 designates a rather long nut or barrel closed at its outer end as at 2, and enlarged into a head 3, the latter having a transverse recess 4 and a hole 5 axial to this member and leading from the recess out of the end of said member. In this hole is rotatably mounted the shank 6 of a swivel whereof one end is connected with the chain C and the other end has a head 7 standing within the recess 4. As a whole we call this the female member of our fastener, and it is connected with one end of the tire chain C or any other element that is to be fastened to a second element.

The numeral 10 designates a hook over whose bend in the present instance is strung a ring 11 which in turn is connected with the other tire chain C, or the other member or element which is to be attached to the first-named element C. The shank 12 of this hook is half-round and threaded as shown. To the tip of the bill of said hook at the point 13 is pivoted member 14. The member 14 has its end, at its pivotal connection with the hook 10 curved to conform with the curvature of the bend of the hook. The body of the member 14 is half-round and threaded as shown, and the rear end thereof is continued into an enlargement 15 which is entirely round and threaded all around so as to fit the threaded bore of the barrel 1. This enlargement where it joins the shank 16 of the keeper has a shoulder 17 standing opposite the inner end 18 of the shank 12 of the hook 10. The flat faces of the two half-round elements oppose each other, and when these elements are moved together as the pivot 13 permits, these faces come together and the end 18 lies adjacent the shoulder 17. At this time the aggregated size of the two half-round shanks is the same as the enlargement 15, and thereby is produced a threaded element or portion which can be screwed into the barrel 1 in a manner which is clear.

In the use of this device on an automobile tire chain as suggested above, one end of the chain C is connected with the swivel at the outer end of the barrel and the other end of the chain is attached to the bend of the hook by suitable means, as the link 11. When now the chain is drawn around the tire and felly and strained as tightly as may be, the shanks 12 and 16 are placed together and the enlargement 15 is passed into the mouth of the bore in the barrel and held, while the entire female member is rotated around the hook and its keeper which we call the male member. Such rotation is permitted by the swivel as will be clear, and as the male member progresses into the female member tension is placed on the chain in a manner which will be readily understood. After the parts are tightened up and the anti-skid chain subjected to rough usage and inclement weather, it will be impossible for it to become loose unless one member rotates with respect to the other, and this is prevented by the fact that the outer ends of both members are enlarged laterally where they lie against the side of the wheel rim and in contact therewith, and such contact prevents their rotation. To remove the chain from the wheel, the operator will raise the head 3 of the female member off the wheel rim, and rotate it until he unscrews the barrel off the threaded portion of the male member. The parts by preference are entirely of metal, and will doubtless be galvanized to prevent rust.

What is claimed as new is—

The herein described separable fastener comprising a female member consisting of an internally threaded barrel open at one end and closed at its other end, an enlarged head adjacent said closed end and provided with a transverse recess and an axial hole, and a swivel rotatably mounted in said hole with its head in said recess; and a male member consisting of a hook having a half-round shank, a keeper pivoted to tip of the hook-bill and also having a half-round shank and a completely round enlargement beyond the end of the shank, the enlargement and the half-round portions being externally threaded to fit within said barrel, for the purpose set forth.

In testimony whereof we affix our signatures.

FURLONG M. BENNETT.
HARLAN S. BENNETT.